United States Patent
Fujiki et al.

(10) Patent No.: US 7,041,149 B2
(45) Date of Patent: May 9, 2006

(54) SINTERED SPROCKET FOR SILENT CHAIN AND PRODUCTION METHOD THEREFOR

(75) Inventors: Akira Fujiki, Yokohama (JP); Yukihiro Maekawa, Yokohama (JP); Yutaka Mabuchi, Yokohama (JP); Takashi Murata, Yokohama (JP); Takashi Suzuki, Matsudo (JP); Jyun-ichi Yamada, Matsudo (JP); Tadayuki Tsutsui, Matsudo (JP); Kei Ishii, Matsudo (JP)

(73) Assignees: Nissan Motor Co., Ltd., Yokohama (JP); Hitachi Powdered Metals Co., Ltd., Matsudo (JP)

( * ) Notice: Subject to any disclaimer, the term of this patent is extended or adjusted under 35 U.S.C. 154(b) by 0 days.

(21) Appl. No.: 10/885,023

(22) Filed: Jul. 7, 2004

(65) Prior Publication Data

US 2005/0039575 A1    Feb. 24, 2005

(30) Foreign Application Priority Data

Jul. 22, 2003  (JP) .............................. 2003-277287
Jul. 5, 2004   (JP) .............................. 2004-197524

(51) Int. Cl.
*B22F 5/08*      (2006.01)
*C22C 33/02*     (2006.01)

(52) U.S. Cl. ........................... 75/246; 75/243; 419/28; 419/29

(58) Field of Classification Search .................. 75/243, 75/246; 419/28, 29

See application file for complete search history.

(56) References Cited

U.S. PATENT DOCUMENTS

| | | | | | |
|---|---|---|---|---|---|
| 2,271,759 | A | * | 2/1942 | Christman | ..................... 72/70 |
| 3,239,910 | A | * | 3/1966 | White | ....................... 29/90.01 |
| 3,735,619 | A | * | 5/1973 | Tersch | ..................... 29/893.32 |
| 5,613,180 | A | * | 3/1997 | Kosco | ............................ 419/5 |
| 5,672,014 | A | * | 9/1997 | Okita et al. | ................. 384/492 |
| 5,954,894 | A | * | 9/1999 | Tsushima | ..................... 148/319 |
| 6,338,747 | B1 | * | 1/2002 | Kosco | .......................... 75/243 |
| 6,473,964 | B1 | * | 11/2002 | Anderson et al. | .......... 29/888.1 |
| 2003/0228949 | A1 | * | 12/2003 | Okabe et al. | ................ 474/161 |

FOREIGN PATENT DOCUMENTS

| | | |
|---|---|---|
| JP | 2001-295915 A | 10/2001 |
| JP | 2002-129295 A | 5/2002 |

* cited by examiner

*Primary Examiner*—Ngoclan T. Mai
(74) *Attorney, Agent, or Firm*—Oliff & Berridge, PLC

(57) ABSTRACT

A sintered sprocket has a high overall density and excellent contact pressure resistance. The sprocket is produced from a sintered alloy selected from the following alloys ((1) to (3)), is densified to have a relative density of 95% or higher in the surface layer of the gear teeth by forming by rolling, having a surface hardness of 700 HV or higher, and is useful for a crankshaft, a cam shaft, a balancer shaft, or a water pump shaft of an internal combustion engine:

(1) an Fe—Mo—C based sintered alloy containing Mo at 1.0 to 2.0% by mass;
(2) an Fe—Mo—Ni—C based sintered alloy containing Mo at more than 1.0 and not more than 2.0% by mass, and Ni at more than 1.0 and not more than 2.5% by mass, or
(3) an Fe—Mo—Ni—Cu—C based sintered alloy containing Mo at 0.3 to 1.0% by mass, Ni at not less than 1.5 to less than 3.0% by mass, and Cu at 1.0 to 2.5% by mass.

7 Claims, No Drawings

SINTERED SPROCKET FOR SILENT CHAIN AND PRODUCTION METHOD THEREFOR

BACKGROUND OF THE INVENTION

1. Field of the Invention

The present invention relates to a sintered sprocket to be used as a sprocket of a cam shaft timing chain of an automotive engine and to a production method therefor.

2. Related Art

As such a sprocket, those formed into sprocket members by forging steel materials, finished by machining, and case hardened and tempered are known. As a sintered sprocket to be produced by a powder metallurgy technique by which forming is facilitated, techniques of producing sprockets made of ferrous materials containing Ni, Mo, Cu, and C by warm-compacting a powder mixture to a relatively high density of around 7.3 $Mg/m^3$ and either sintering formed bodies at a temperature of 1,180° C. or higher or case hardening or induction hardening the sintered bodies; and then tempering the obtained bodies have been proposed (see Japanese Patent Application Laid-Open No. 2001-295915, page 2; hereinafter referred to as Patent Document No. 1). Furthermore, techniques involving densifying the gear teeth of sintered bodies made of ferrous materials with similar compositions by forming by rolling and then case hardening and tempering the gear teeth have been proposed (reference to Japanese Patent Application Laid-Open No. 2002-129295, page 2; hereinafter referred to as Patent Document No. 2).

Since a sprocket for a silent chain has a structure of interlocking gears and transmits rotation by interlocking the gears, as compared with that of a common sprocket for a roller chain, the interlocking contact pressure of the sprocket for a silent chain is high. Therefore, the sprocket for a silent chain is required to have a high density in the gears as compared with that of a sprocket for a roller chain and also a high hardness by hardening.

The sintered sprockets described in the above-mentioned Patent Documents Nos. 1 and 2 are, respectively, superior; however, as described in the Patent Document No. 1, in the case in which the entire density is adjusted to be relatively high, at about 7.3 $Mg/m^3$, by employing warm-compaction for powder compacting and sintering is performed at a temperature as high as 1,180° C. or higher, the sintering temperature is high, and therefore the production cost is adversely increased and the overall density becomes high due to the warm-compaction. However, since the density of the gear faces and the density of other parts are the same, there is still some room remaining for further improvement of the contact pressure resistance of the gear faces.

Also, as described in the Patent Document No. 2, in the case in which the gear teeth of the sintered body of a desirable alloy structure with an alloy composition similar to those described in the Patent Document No. 1 and containing a ferrite structure of 40% or more by surface area and having good plastic processibility are densified by forming by rolling, the surface is further densified, and therefore, the forming by rolling margin must be made wide, and consequently, there is still some room remaining for further improvement in the production efficiency.

SUMMARY OF THE INVENTION

The invention has been made under the above-mentioned circumstances and aims to provide a sintered sprocket for a silent chain and a method for producing such a sintered sprocket for a silent chain by using a sintered alloy with good hardenability, assuring a higher overall density, and excellent contact pressure resistance by densifying the gear faces by forming by rolling.

The sintered sprocket for a silent chain of the invention is produced, as described in a first aspect of the invention, from (1) an Fe—Mo—C based sintered alloy with a composition containing Mo at 1.0 to 2.0% by mass, (2) an Fe—Mo—Ni—C based sintered alloy containing Mo at more than 1.0 and not more than 2.0% by mass, and Ni at more than 1.0 and not more than 2.5% by mass, or (3) an Fe—Mo—Ni—Cu—C based sintered alloy containing Mo at 0.3 to 1.0% by mass, Ni at not less than 1.5 to less than 3.0% by mass, and Cu at 1.0 to 2.5% by mass; is densified to have a relative density 95% or higher in the surface layer of the gear teeth by forming by rolling; and has a surface hardness of 700 HV or higher.

The production method for the sintered sprocket for a silent chain of the invention, as described in a second aspect of the invention, is characterized in that an iron alloy powder having a composition selected from (1) Mo 1.0 to 2.0% by mass and the balance of Fe and inevitable impurities; (2) 1.0%≦Mo≦2% by mass, 1.0%<Ni≦2.5% by mass, and the balance of Fe and inevitable impurities; and (3) Mo at 0.3 to 1.0% by mass, 1.5%≦ Ni<3% by mass, Cu at 1.0 to 2.5% by mass, and the balance of Fe and inevitable impurities is used and that the method involves compacting and sintering a powder mixture containing the iron alloy powder and a graphite powder; forming by rolling the obtained material for densifying the surface; and then case hardening and tempering the sintered body for making the surface hardness of 700 HV or higher.

In the production method for such a sintered sprocket for a silent chain, it is preferable, as described in a third aspect of the invention, that the above-mentioned compaction is performed by warm-compaction: it is also preferable, as described in a fourth aspect of the invention, that the case hardening is performed by holding the sintered body at different temperatures in two stages in a temperature range for transformation to austenite and then quenching: and it is also preferable, as described in a fifth aspect of the invention, that the forming by rolling be performed so as to adjust the relative density of the gear surface to be 95% or higher.

Furthermore, in the forming by rolling step, as described in a sixth aspect of the invention, it is preferable that the gear teeth of the sprocket member be formed by rolling are previously chamfered in consideration of burring of an excess margin by forming by rolling and as in a seventh aspect of the invention, it is preferable that during the forming by rolling, the excess margin protruded out of the gear end faces of a work by the forming by rolling is removed by a removal tool attached to a forming apparatus for rolling.

EMBODIMENTS OF THE INVENTION

Hereinafter, embodiments of the invention will be described.

(1) Component of the Sintered Alloy

Target sintered alloys of the invention are three based alloys, Fe—Mo—C based alloy, Fe—Mo—Ni—C based alloy, and Fe—Mo—Ni—Cu—C based alloy and these alloys are selected since they are composed of a few allowing addition elements and have with good plastic processibility, high toughness, and good hardenability as well merely by adjusting the contents of the respective elements. In comparison among, the above-mentioned three compositions, the strength is relatively lowest in the first and increase in the order above, and they are all excellent in plastic processibility and hardenability.

The carbon amount in a sintered body is optimal at 0.5 to 0.6% by mass in order to assure the strength, the toughness, and the plastic processibility. Furthermore, the carbon amount of the surface layer is increased by about 0.1 to 0.2% by mass by case hardening; it is preferable that the surface layer be transformed to have a martensite structure by the hardening.

The effects of the respective elements to be added are as follows.

Mo is effective for strengthening the iron alloy matrix and increasing the strength and also increasing the hardenability. However, if the content is too high, it results in brittleness and difficulty of densification by forming by rolling.

Ni is effective for improving the sintering density and the toughness. However if the content is too high, it results in difficulty of densification by forming by rolling due to brittleness.

Cu is effective in strengthening the iron alloy matrix and increasing the strength and also increasing the hardenability. However, if the content is too high, the size expansion is increased at the time of sintering and therefore, size change variation occurs, causing the formation by rolling unevenness.

(2) Composition Range of Sintered Alloy and Powder Mixture

The first Fe—Mo—C based alloy is composed of the fewest elements. The Mo content is 1.0 to 2.0% by mass. If the content is less than 1.0% by mass, the above-mentioned effect cannot be obtained, and if it exceeds 2.0% by mass, the above-mentioned disadvantage occurs, and therefore it is not preferable.

With respect to the powder to be used for the production, if Mo is added in the form of a Mo powder, the alloying is performed incompletely at the time of sintering, resulting in difficulty in reliably obtaining sufficient strength, and therefore an Fe—Mo alloy powder is preferable. Even in the case of using the iron alloy powder, compressibility of the powder can be sufficiently obtained by a warm-powder-compaction method, which will be described later. Also, in the case of another based alloy to be described later, carbon is similarly added in the form of a graphite powder, and in order to adjust the bonding carbon content in the sintered body to be about 0.5 to 0.6% by mass, 0.6 to 1.0% by mass of the graphite powder is added. Furthermore, the powder mixture is heated to 100 to 150° C. and is formed by compaction. A lubricant for warm compaction is added as it is in general.

The second Fe—Mo—Ni—C based alloy contains Ni in additional to the above-mentioned first sintered alloy composition element in order to increase the toughness. With respect to the combination of the components, the content of Mo is more than 1.0 and not more than 2.0% by mass, and the content of Ni is more than 1.0 and not more than 2.5% by mass.

In this case, if the contents of Mo and Ni are set respectively slightly higher, the plastic processibility is slightly decreased, and therefore, it is preferable that the contents be adjusted in the respectively defined ranges or that one be adjusted to be less and the other be adjusted to be more.

The powder to be used for the production is preferably an iron-based powder comprising Ni metal particles diffused and bonded to the surrounding of an Fe and Mo alloy powder. This is because segregation of components can be avoided as compared with the case of mixing metal powders of the respective components, and also because Ni is diffused in the surface of the Fe—Mo alloy particles at the time of sintering as compared with the case of using an iron-based alloy powder comprising Mo metal particles diffused and bonded to the surrounding of an Fe and Ni alloy powder, and therefore, the density is advantageously improved by sintering, and accordingly, the strength and the toughness are improved.

The third Fe—Mo—Ni—Cu—C based alloy has a slightly lower Mo content and contains Cu in addition to the above-mentioned second sintered alloy composition element in order to increase the toughness. With respect to the combination of the components, the content of Mo is 0.3 to 1.0% by mass, the content of Ni is not less than 1.5 to less than 3.0% by mass, and the content of Cu is 1.0 to 2.5% by mass. If the respective contents are below the above-mentioned ranges, although the plastic processibility is good, the strength and hardenability are improved slightly and if the contents are higher, forming by rolling becomes difficult.

The powder to be used for the production, an iron-based powder comprising metal particles of Ni, Mo, and Cu diffused and bonded to the surrounding of the iron particles is preferable to use. This is because segregation of components can be avoided as compared with the case of mixing metal powders of the respective components.

(3) Warm-Compaction

A powder obtained by mixing a lubricant with temperature-stability and a graphite powder with an iron alloy powder is heated to 100° C. or higher and compacted by a die heated to 120° C. or higher. The warm-powder-compaction is performed with good powder compaction. For example, the green density achieved by forming pressure of 490 MPa (5,000 kgf/cm$^2$) is higher by about 0.1 Mg/m$^3$ than that in the case of a normal temperature compacting, and therefore, a high density can be obtained by using a conventional compacting press. In other words, a green compact with a normal density can be obtained by compacting at a low pressure. Also, it is found that as compared with a sintered body produced by normal temperature powder compacting, a sintered body obtained in such a warm-compacting manner has fewer coarse voids, and therefore the metallurgical bonding among particles is improved.

(4) Sintering

Sintering is performed by a normal method. The sintering temperature is about 1,120 to 1,150° C. This temperature is a normal sintering temperature of an iron-based sintered alloy and is lower than the sintering temperature in the case of the above-mentioned conventional technique.

(5) Gear Forming by Rolling of Sintered Body

The gear forming by rolling of the sintered body can be performed by using a common forming apparatus for rolling in which the sintered body of a sprocket is fixed with a rotatable shaft, and two gears are rotated in a condition of being pressed against the gear teeth of sintered body. Accordingly, the gear surface of the sintered sprocket can be plastically deformed and densified. The densified surface layer can be provided with higher contact pressure fatigue resistance if the density is higher and if the relative density of the densified surface layer is 95% or higher, the wear resistance of the heat treated product becomes sufficiently high.

In the case in which the margin for forming by rolling is made wide, unnecessary burrs may be extruded at the end part of the gear teeth of the sprocket member which is to be formed by rolling in some cases, and in consideration of the unnecessary burrs, the gear edge of the green compact is desirably chamfered previously. As described in Japanese Patent Application Laid-Open No. 11-347674, it is also desirable to cut and remove the excess margin extruded out of the gear end face by pressing a cutting tool attached to a forming apparatus for rolling to the sintered sprocket being formed by rolling during the forming by rolling.

(6) Heat Treatment

The rolled sprocket member is subjected to cutting treatment in the end face based on need and is hardened and tempered. Since sufficient wear resistance cannot be obtained if the member is left as it is when sintered or formed by rolling, in order to reliably obtain a high contact pressure resistance and a high pitching resistance, it is required to make at least the gear surface have a hard martensite structure. Here, the "hard" means 700 HV or higher surface hardness.

The hardening can be performed by normal case hardening and in a temperature range for transforming the sintered alloy to be austenite ($A_3$ transformation range), it is preferable to carry out the hardening by keeping the sintered alloy at different temperatures in two stages and then quenching the alloy. That is, in the case hardening, heating is performed at a relatively higher temperature in the first stage to carburize the densified surface part and then heating is performed at a normal hardening temperature in the second stage. If the hardening is performed at a lower temperature than that in the previous stage, carburization is further efficiently and evenly performed to yield a high hardness by hardening, suppress the residual austenite formation, and good dimensional precision with little thermal treatment stress. In this case, carburization may be performed in a carburizing gas atmosphere during the former half period of the first stage and mainly diffusion is promoted in a gas atmosphere suitable for preventing decarburization in the latter half. The heating time is in a range in which the crystal grains do not become coarse. The heating in the first stage is 900 to 950° C. ($A_3$ transformation temperature+about 100° C.) and the heating in the second stage is 830 to 870° C. ($A_3$ transformation temperature+about 50° C.).

The tempering can be performed at a temperature around 180° C. in atmospheric air, similarly to the tempering of an iron steel material.

EXAMPLES

Hereinafter the invention will be described more in detail along with Examples. The sintered sprockets of the Examples and Comparative Examples have 44 gear teeth, 89 mm gear tip diameter, 20 mm inner diameter, and 8.5 mm average thickness and are formed into shapes respectively having steps in the gear periphery and in the inner diameter periphery. The physical properties of the sintered alloys are measured by using test specimens produced by the same method as the method for producing the sintered sprockets.

Hereinafter, the alloy compositions are expressed on the basis of "% by mass" and for brevity, "%" is employed.

Specimen of Example 1

During production of a sprocket of Example 1, a powder mixture of an Fe—Mo alloy powder containing 1.5% of Mo mixed with 0.8% graphite powder and a lubricant was heated first to 130° C., compacted by using a die heated at 150° C. and then sintered at 1,140° C. Next, the gear teeth of the sintered sprocket member were formed by rolling. The resulting rolled sprocket member was subjected to heat treatment. The case hardening was performed by keeping the member at first at 930° C. and then at a decreased temperature 850° C. and quenching the member in an oil. The hardened product was tempered at 180° C. for 60 minutes.

Specimen of Example 2

The sprocket of Example 2 was produced in the same procedure as the sprocket of Example 1. The point of difference of the sprocket of Example 2 from the sprocket of Example 1 was that a powder mixture of an Fe-based alloy powder comprising Ni metal particles diffused and bonded to a powder of an alloy of Fe and Mo, 0.8% graphite powder, and a lubricant was used. The composition of the Fe-based alloy powder contained 2% Ni and 1.5% Mo.

Specimen of Example 3

The sprocket of Example 3 was also produced using the same procedure as for the sprocket of Example 1. A powder mixture of an Fe powder comprising Ni, Mo, and Cu metal particles diffused and bonded to an Fe powder, 0.8% graphite powder, and a lubricant was used. The composition of the Fe-based alloy powder contained 2% Ni, 0.5% Mo, and 2% Cu.

Specimen of Example 4

The sprocket of Example 4 was produced using the same procedure as for the sprocket of Example 2. The point of difference of the sprocket of Example 4 from the sprocket of Example 2 was that the sintering temperature was adjusted to be 1,190° C.

Comparative Examples 1 to 3 respectively correspond to Example 1, Example 4, and Example 3 described respectively in Japanese Patent Application Laid-Open No. 2001-295915 (the above-mentioned Patent Document No. 1). The hardness was calculated on the basis of HRA.

Specimen of Comparative Example 1

The specimen was same as that of Example 1 in the above-mentioned Patent Document and a powder mixture of an Fe powder comprising Ni, Mo, and Cu metal particles diffused and bonded to Fe particles, 1% of graphite powder, and a lubricant was used. The composition of the Fe-based alloy powder contained 4% Ni, 0.5% Mo, and 2% Cu. The warm-powder-compaction was performed in the same manner as the respective Examples and sintering was performed at a temperature of 1,195° C. to obtain the sintered body.

Specimen of Comparative Example 2

The specimen was the same as that of Example 4 in the above-mentioned Patent Document. The specimen was obtained by sintering a green compact obtained in the same manner as described in Comparative Example 1 at 1,200° C. for producing a sintered member and subjecting the sintered member to induction hardening and tempering.

Specimen of Comparative Example 3

The specimen was the same as that of Example 3 in the above-mentioned Patent Document. The specimen was obtained by using a powder mixture of an Fe-based alloy powder, which comprises Ni powder particles diffused and bonded to an Fe—Mo alloy powder and has a composition containing 1.5% of Mo and 2% of Ni, 1% of graphite powder by mass, and a lubricant; sintering the green compact, which was obtained by warm-compacting the powder mixture, at 1,260° C., and then case hardening and tempering the sintered body.

Cross-Sectional Microscopic Structure of Specimens of Examples

The cross-sectional microscopic structures of gear teeth of the sprockets of respective Examples were found having pearlite structure containing bonding carbon amount about 0.6% in the respective sintered bodies and the porosities of the rolled surface layers were about 1 to 3%.

The peripheral parts of the gear teeth of the hardened sprockets were found to have a martensite structure.

Evaluation Method

The respective sintered sprockets were disposed in commercialized automotive gasoline engines and the wear loss of the gear teeth of the sprockets in the case of practical driving under the following conditions (1) to (5) was measured by using a shape measuring apparatus.
(1) Silent chain tensile force (cantilever tension) at the time of the test: 1500N,
(2) Engine rotation speed: 6,000 rpm,
(3) Test duration: 100 hours,
(4) Oil for the test: 5W-30SG, and
(5) Test temperature: 110° C.

Evaluation Results

Table 1 shows the contents of Cu, Ni, and Mo in the sintered alloys, sintering temperature, performance of forming, method for hardening, physical properties of specimens produced in the same manner as that employed for the sprockets, and wear loss of the sprockets. The wear loss of the sprockets was indicated as a ratio in the case in which the wear loss of the Comparative Example 1 was standardized to be 100.

TABLE 1

| | sprocket production conditions | | | | | |
|---|---|---|---|---|---|---|
| Classification | components (mass %) | | | sintering temperature ° C. | hardning | forming by rolling |
| | Cu | Ni | Mo | | | |
| Comparative Example 1 | 2 | 4 | 0.5 | 1195 | none | none |
| Comparative Example 2 | 2 | 4 | 0.5 | 1200 | induction hardening | none |
| Comparative Example 3 | 0 | 2 | 1.5 | 1260 | case hardening | none |
| Example 1 | 0 | 0 | 1.5 | 1140 | case hardening | done |
| Example 2 | 0 | 2 | 1.5 | 1140 | case hardening | done |
| Example 3 | 2 | 2 | 0.5 | 1140 | case hardening | done |
| Example 4 | 0 | 2 | 1.5 | 1190 | case hardening | done |

| | physical properties of specimens produced in the same production conditions | | | |
|---|---|---|---|---|
| Classification | density Mg/m³ | hardness HRA | tensile strength MPa | wear loss ratio |
| Comparative Example 1 | 7.3 | 65 | 800 | 100 |
| Comparative Example 2 | 7.3 | 69 | 1250 | 68 |
| Comparative Example 3 | 7.3 | 70 | 1300 | 57 |
| Example 1 | 7 | 69 | 920 | 76 |
| Example 2 | 7 | 69 | 960 | 58 |
| Example 3 | 7 | 70 | 980 | 60 |
| Example 4 | 7 | 70 | 1090 | 54 |

As is clear from Table 1, the respective Examples had low densities as compared with those of the Comparative Examples and the tensile strengths of the sintered bodies were found to be slightly low. However, since the gear teeth were densified by forming by rolling and case-hardened, the wear loss was lowest showing excellent results in Example 4 in which the sintering was performed at a sintering temperature as high as the temperature in the respective Comparative Examples. Also, with the wear loss amounts of sintered bodies obtained by sintering at a temperature of 1,140° C. (Examples 1 to 3), the wear loss amount of Example 1 was higher than those of thermally treated products of Comparative Examples 2 and 3; however, it was lower than that of Comparative Example 1 and the wear loss amounts of Examples 2 and 3 were found to be satisfactory amounts.

As it is made clear from these results, if the density is increased by advantageously utilizing the characteristics of the warm-compaction, wear loss can be naturally suppressed.

The invention claimed is:

1. A sintered sprocket for a silent chain in a crankshaft, a cam shaft, a balancer shaft, or a water pump shaft of an internal combustion engine, composed of a sintered alloy selected from one of (1) to (3), the sprocket being densified to have a relative density of 95% or higher in a surface layer of gear teeth by forming by rolling, at least the gear surface having only a martensite structure and having a surface hardness of 700 HV or higher:
    (1) an Fe—Mo—C based sintered alloy containing Mo at 1.0 to 2.0% by mass;
    (2) an Fe—Mo—Ni—C based sintered alloy containing Mo at more than 1.0 and not more than 2.0% by mass, and Ni at more than 1.0 and not more than 2.5% by mass, or
    (3) an Fe—Mo—Ni—Cu—C based sintered alloy containing Mo at 0.3 to 1.0% by mass, Ni at not less than 1.5 to less than 3.0% by mass, and Cu at 1.0 to 2.5% by mass.

2. A production method for a sintered sprocket for a silent chain, comprising steps of:
    using an iron alloy powder having a composition selected from the following (1) to (3)
    (1) Mo at 1.0 to 2.0% and balance of Fe and inevitable impurities by mass,
    (2) 1.0%<Mo≦2%, 1.0%<Ni≦2.5% and balance of Fe and inevitable impurities by mass, and
    (3) Mo at 0.3 to 1.0%, 1.5%≦Ni<3%, Cu at 1.0 to 2.5%, and balance of Fe and inevitable impurities by mass;
    compacting and sintering a powder mixture containing the iron alloy powder and a graphite powder;
    forming by rolling the obtained material for densifying a surface; and
    performing a case hardening and a tempering of the sintered body to obtain a gear surface having only a martensite structure and having a surface hardness of 700 HV at least.

3. The production method for a sintered sprocket for a silent chain according to claim 2, wherein a compacting of the powder mixture is performed by a warm-compacting.

4. The production method for a sintered sprocket for a silent chain according to claim 2, wherein the case hardening is performed by keeping the sintered alloy at different temperatures in two stages in an austenitic transformation temperature range of the sintered alloy, and is then performed by quenching.

5. The production method for a sintered sprocket for a silent chain according to claim 2, wherein the relative density of the gear teeth surface is adjusted to be 95% or higher by forming by rolling.

6. The production method for a sintered sprocket for a silent chain according to claim 2, wherein the gear teeth of the sprocket member to be formed for rolling are previously chamfered in consideration of burrs extruded by the forming by rolling.

7. The production method for a sintered sprocket for a silent chain according to claim 2, wherein burrs extruded from the gear teeth end face of a work by the forming by rolling is removed by using a removal tool attached to a forming apparatus for rolling during the forming.

* * * * *